United States Patent [19]
Ishii et al.

[11] Patent Number: 5,960,553
[45] Date of Patent: Oct. 5, 1999

[54] CONVERSION MECHANISM OF DIAL GAUGE

[75] Inventors: Munenori Ishii; Toshiyuki Shinohara, both of Utsunomiya, Japan

[73] Assignee: Mitutoyo Corporation, Kawasaki, Japan

[21] Appl. No.: 08/943,155

[22] Filed: Oct. 3, 1997

[30] Foreign Application Priority Data

Oct. 8, 1996 [JP] Japan ................................. 8-267193

[51] Int. Cl.⁶ ................................................ G01B 3/22
[52] U.S. Cl. ............................................................ 33/556
[58] Field of Search ................................. 33/556, DIG. 6

[56] References Cited

U.S. PATENT DOCUMENTS

| | | | |
|---|---|---|---|
| 1,425,193 | 8/1922 | Gates | 33/556 |
| 1,433,076 | 10/1922 | Green | 33/556 |
| 1,937,936 | 12/1933 | Aldeborgh et al. | 33/556 |
| 2,074,279 | 3/1937 | Sisson | 33/556 |
| 2,093,066 | 9/1937 | Ames | 33/DIG. 6 |
| 2,663,945 | 12/1953 | Emery | 33/556 |
| 3,464,118 | 9/1969 | Nagata | 33/556 |
| 3,721,010 | 3/1973 | Ristow | 33/556 |
| 4,907,347 | 3/1990 | Pease | 33/720 |
| 5,189,796 | 3/1993 | Ginggen et al. | 33/DIG. 6 |

FOREIGN PATENT DOCUMENTS

| | | | |
|---|---|---|---|
| 595788 | 3/1935 | Germany | 33/556 |
| 35 43 236 | 6/1987 | Germany . | |
| 40 18 364 | 12/1991 | Germany . | |
| 50-149364 | 11/1975 | Japan . | |
| 272300 | 3/1951 | Switzerland | 33/556 |
| 352 497 | 4/1961 | Switzerland . | |

*Primary Examiner*—G. Bradley Bennett
*Attorney, Agent, or Firm*—Oliff & Berridge, PLC

[57] ABSTRACT

A conversion mechanism of a dial gauge is provided with a spindle having a measuring point on the top end, and a sector gear having an abutting portion abutting on an engaging portion provided on the spindle, in which a sliding movement of the spindle is converted into a turning movement of the sector gear through the engaging portion and the abutting portion, then the turning movement is converted into a turning amount of a pointer. In such conversion mechanism of the dial gauge, the sector gear is integrally molded with the metal abutting portion with a plastic material, and the pointer adjusting means is provided, which enables to change the turning angle of the pointer without changing the position in the sliding direction of the measuring point on the spindle. Since the sector gear is integrally built, the cost of parts can be decreased, and since the pointer adjusting means is provided, the measurement at the easy-to-read position on the dial plate can be materialized.

15 Claims, 9 Drawing Sheets

CONVERSION MECHANISM OF DIAL GAUGE

BACKGROUND OF THE INVENTION

1. Field of the Invention

The present invention relates to a conversion mechanism applicable to a high magnification dial gauge that magnifies the sliding amount of a spindle by a sector gear of which one end is supported by a case body in a turnable manner and displays the sliding amount using a turning amount of a pointer.

2. Description of the Related Art

A dial gauge that magnifies the sliding amount of a spindle by a sector gear of which one end is supported with a case body in a turnable manner and displays the sliding amount as a turing amount of a pointer has been known.

The dial gauge having such a magnification mechanism by the sector gear can be used for precision measurement and the like, because even only a slight slide of the spindle is detected as a change in the turing amount of the pointer.

For instance, a dial gauge 10 shown in FIG. 6 and FIG. 7 is known as a dial gauge having the sector gear.

The dial gauge 10 shown in FIG. 6 is formed including a body case 11 which holds a pointer 50 and a dial plate 51, and a spindle 20 which passes through the body case 11 and is supported by the body case in a slidable manner. When the spindle slides in the direction of the arrow A the pointer 50 turns through a sector gear 30 (shown in FIG. 7) and gives the amount of the slide of the spindle 20.

The inside of the dial gauge 10 has a configuration shown in FIG. 7, and the sector gear 30, a gear system 40, the pointer 50 and the dial plate 51 (shown in FIG. 7) are housed inside the body case 11.

The spindle 20 is a rodlike member extruding in a sliding direction, and is provided with a measuring point 21 on the end portion and a rack pin 22 which serves as a engaging portion projecting toward the outside of the diameter in the direction of the spindle 20 at the middle of the spindle 20.

The sector gear 30 is fixed in a rotatable manner on one end (upper left in FIG. 7) to the body case 11 by a sector shaft 32, and a gear portion 33 is formed on the other end.

An arm pin 34 which is an abutting portion to abut on the rack pin 22 of the spindle 20, thrusts through an arm 35 on the middle of the sector gear 30.

Though not shown in FIG. 7, the spindle 20 is resiliently biased so that the measuring point 21 protrudes from the body case 11 and the sector gear 30 is rotatably biased counterclockwisearound the sector shaft 32.

Thus, the rack pin 22 and the arm pin 34 remain in contact with each other, wherever the position in the sliding direction of the spindle 20 may be.

The gear system 40 is formed including a middle pinion 41 which engaged with the gear portion 33 of the sector gear 30, a large gear wheel 42 integrated with the middle pinion 41, and a center pinion 43 which is engaged with the large gear wheel 42 and turns the shaft of the pointer 50.

The slide of the spindle 20 in the direction A is converted into the clockwise rotation pivoting on the sector shaft 32 of the sector gear 30 through the rack pin 22 and the arm pin 34. After that, the rotation of the sector gear 30 in the clockwise direction turns the middle pinion 41 and the large gear 30 in the clockwise direction through the gear portion 33, and the pointer 50 turns clockwise through the center pinion 43 which is meshed with the large gear wheel 42.

Similarly, when the spindle 20 slides in the A' direction, the pointer 50 turns counterclockwise.

In a conversion system of a dial gauge having the configuration, the sector gear 30 is provided with the arm 35 fixed on the sector gear 30 in a rotatable manner with a machine screw 35A, and an eccentric cam 36 abutting to the side surface of the arm 35 and controlling the turning of the arm 35 as shown in FIG. 8 and FIG. 9. The arm pin 34 is protruded from the arm 35.

The reason of the sector gear having such a configuration is to prevent the effect of excessive moment on a connecting portion 37 of the arm pin 34 by the force along the direction of B caused by the rack pin 22, through minimizing the protrusion size D of the arm pin 34.

However, in the sector gear 30 having such a configuration, the arm 35 and the eccentric cam 36 must be separately provided on the sector gear 35, thus making a disadvantage of cost for parts due to the increase of the number of parts.

Moreover, when the sector gear 30 is housed in the body case 11, the dimension R that is a distance between the sector shaft 32 and the arm pin 34 must be adjusted, thus making another disadvantage of increasing in complexity of assembling of the dial gauge 10.

On the other hand, in a case that an object is measured with the dial gauge 10, comparing with a reference block, when the measuring point 21 is abutted to the reference block, the turning angle of the pointer 50 does not always match with the zero position on the dial plate 51.

Therefore, hitherto, the dial plate 51 has been made turnable from outside of the body case 11 as shown in FIG. 6, and the measurement is carried out after the zero position of the dial plate is adjusted to the turning angle of the pointer 50 (in the C-direction in FIG. 6).

However, there arises another disadvantage that in some Turing angles of the pointer 50, readout of numbers on the dial plate 51 becomes difficult.

Further, when the dial plate 51 is turned, a deviation between a dial range of the dial plate 51 and a turning range of the pointer 50 is sometimes created. In this case, the pointer 50 possibly indicates a point A where there is no mark on the dial plate 51 so that the turning amount of the pointer 50 can not be read out from the dial plate 51.

It is the first object of the present invention to present a conversion mechanism of the dial gauge to decrease the number of parts and simplify the assembling.

The second object of the present invention is to present a conversion mechanism of the dial gauge to enable to change a turning angle of the pointer without changing a position of the measuring point in the sliding direction.

SUMMARY OF THE INVENTION

A conversion mechanism of a dial gauge relating to the present invention, is the conversion mechanism which is formed including with a spindle with a measuring point on the end portion attached to a body case in a slidable manner in its axial direction, an engaging portion which protrudes toward the outside of the diameter of the spindle and moves with a sliding movement of the spindle, and a sector gear supported by the body case in a turnable manner and having an abutting portion abutting to the engaging portion, and the sliding movement of the spindle converts into a rotation of the sector gear through the engaging portion and the abutting portion, then the rotation of the sector gear converts into the amount of turning of the pointer. The present invention features that the sector gear is formed by molding a plastic material and the abutting portion is integrally formed with the sector gear by insert molding.

When the conversion mechanism of the dial gauge above described is used, parts such as an arm and eccentric cam can be omitted due to the integral molding of the abutting portion with the sector gear, and then the number of sector gear parts can be reduced.

Besides, as a distance R between a sector shaft and the abutting portion can be accurately maintained due to the integral molding, the assembling of the dial gauge can be simplified with no necessity of adjusting work for the sector gear.

Since the sector gear is formed by molding a plastic material, the shape of the sector gear can be determined at will in the design stage, that enables to produce the sector gear having a shape corresponding to the required performance such as thickening of the sector gear near the abutting portion without limitation.

Furthermore, adoption of insert molding makes it possible that a metal abutting portion with a high stiffness is integrally molded with the sector gear so that a hard-to-deform abutting portion can be integrally provided to the sector gear.

In the above described explanation, it is preferable to use fiber reinforced plastics as the plastic material for the sector gear, especially, a fiber reinforced polyacetal is most preferable.

That is, when a fiber reinforced plastic is adopted for the sector gear material, the strength of the sector gear is increased, enabling to manufacture a durable dial gauge, and especially the use of polyacetal makes a good abrasion resistant sector gear, so that the durability of the dial gauge is much improved.

When a fiber reinforced plastic is used for the sector gear, it is preferable to adopt a potassium titanate whisker reinforced polyacetal.

In other words, when potassium titanate whisker is adopted as a fiber material for a fiber reinforced plastic, the surface of the sector gear becomes smooth, so that a sector gear having a good engaging property with other gears can be manufactured.

In the conversion mechanism of the dial gauge above described, it is preferable to provide a pointer adjusting means for being able to change turning angles of the pointer without changing position of the measuring point which is on the end portion of the spindle, in the sliding direction.

That is, once the pointer adjusting means is provided, the pointer can be adjusted to the zero position on the dial plate by moving the pointer after the measuring point is set on the reference block, so that a mechanism for turning the dial plate becomes unnecessary, and moreover it becomes possible to carry out measurements with always setting the dial plate in an easy-to-read condition because the turning of the dial plate is not needed.

Since the possibility of deviation between the turning range of the pointer and the mark range of the dial plate is eliminated because the pointer adjustment becomes possible, the reading of the dial is always possible irrespective of the turning angles of the pointer, and measurements can be carried out in an appropriate correspondence between the range of turning and the range of marks.

As for the pointer adjusting means, it is preferable to adopt the pointer adjusting means which is formed including a sliding top provided to the spindle in a slidable manner in the axial direction and having an engaging portion above described, and a fixing means for fixing the sliding top on any position in the axial direction of the spindle.

That is, since the pointer adjusting means is thus provided with the sliding top with the engaging portion and the fixing means, it becomes possible to fix the engaging portion of the sliding top on any position in the axial direction of the spindle with the fixing means. Therefore, it becomes possible to turn the sector gear through the abutting portion abutting to the engaging portion without moving the position of the measuring point on the spindle in the sliding direction, and thus it becomes possible to change the turning angle of the pointer.

Further, as for the fixing means above described, it is preferable to adopt a fixing means which is formed including an adjusting member screwed in the base end portion of the spindle and a resilient member biasing toward the direction that the sliding top abuts the adjusting member.

That is, by adopting this sort of fixing means, it becomes possible to change the position of the engaging portion on the sliding top through delicate turning of the adjusting member, thus the delicate change of the turning angle of the pointer becomes possible.

As for the pointer adjusting means, it is preferable to adopt a pointer adjusting means which is formed including a turning top provided on the spindle in a turnable manner around the axis, and a fixing means for fixing the turning top at any given angle, wherein the turning top has an engaging portion including an inclined surface inclined to the cross section along its radial direction.

The above described inclined surface includes not only a flat inclined surface which is beveled against the cross section along the radial direction of the turning top but also a concave or a convex surface which is cut out from a portion of a sphere. And the inclined surface here includes not only the surface formed on all over the circumference of the radial section of the turning top, but also partially formed surfaces. In brief, it is essential to have an inclined surface which has a shape to change the position of the abutting portion abutting to the engaging portion by the turning of the turning top.

DETAILED DESCRIPTION OF THE PREFERRED EMBODIMENT(S)

A first embodiment of the present invention will be explained here based on the drawings. Incidentally, same designations are given to the same or similar members or portions which have been already explained and the explanations for them are omitted or simplified.

Figure 1:
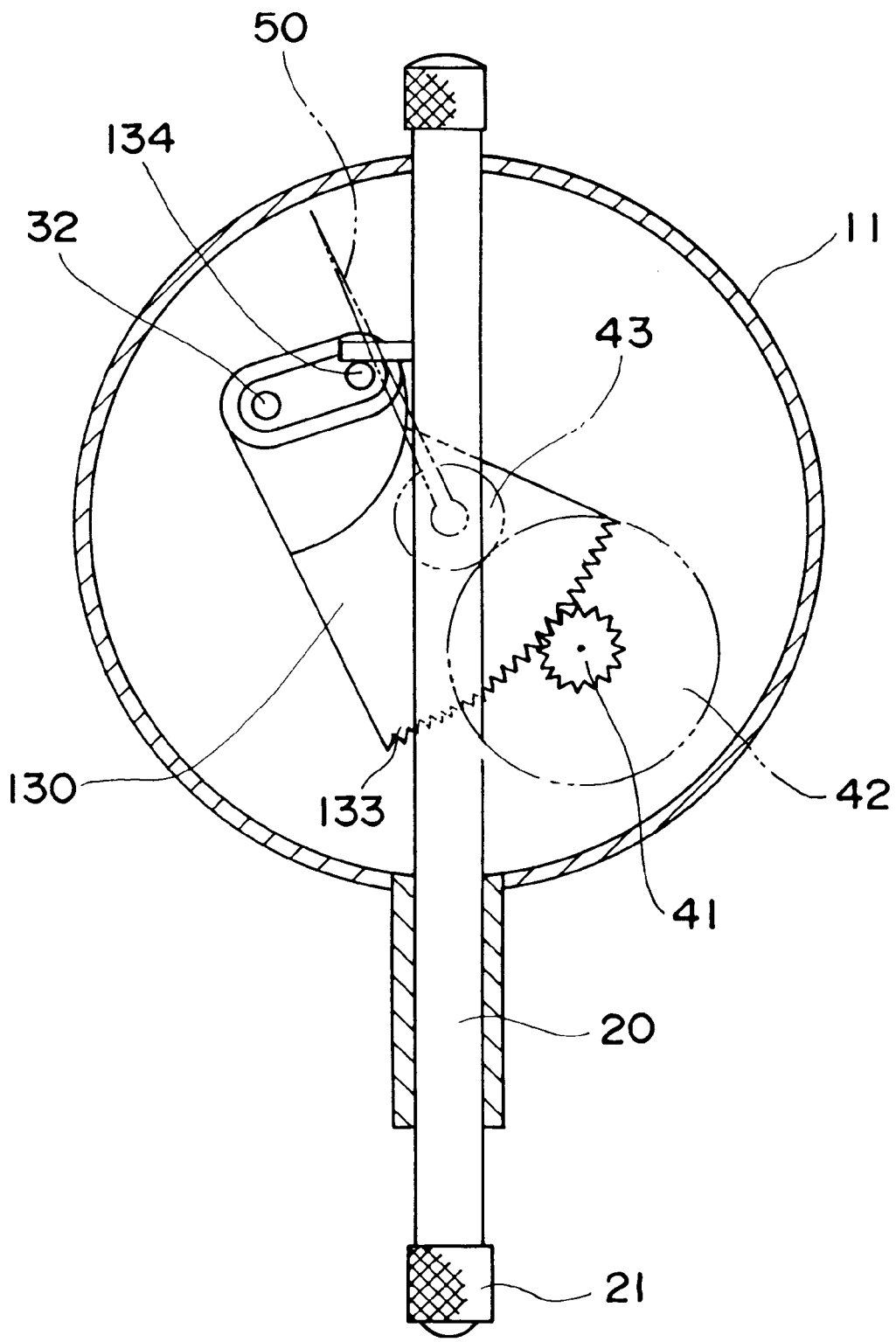
FIG. 1 is a cross sectional view of the inner structure of a dial gauge relating to a first embodiment of the present invention.
Figure 7:
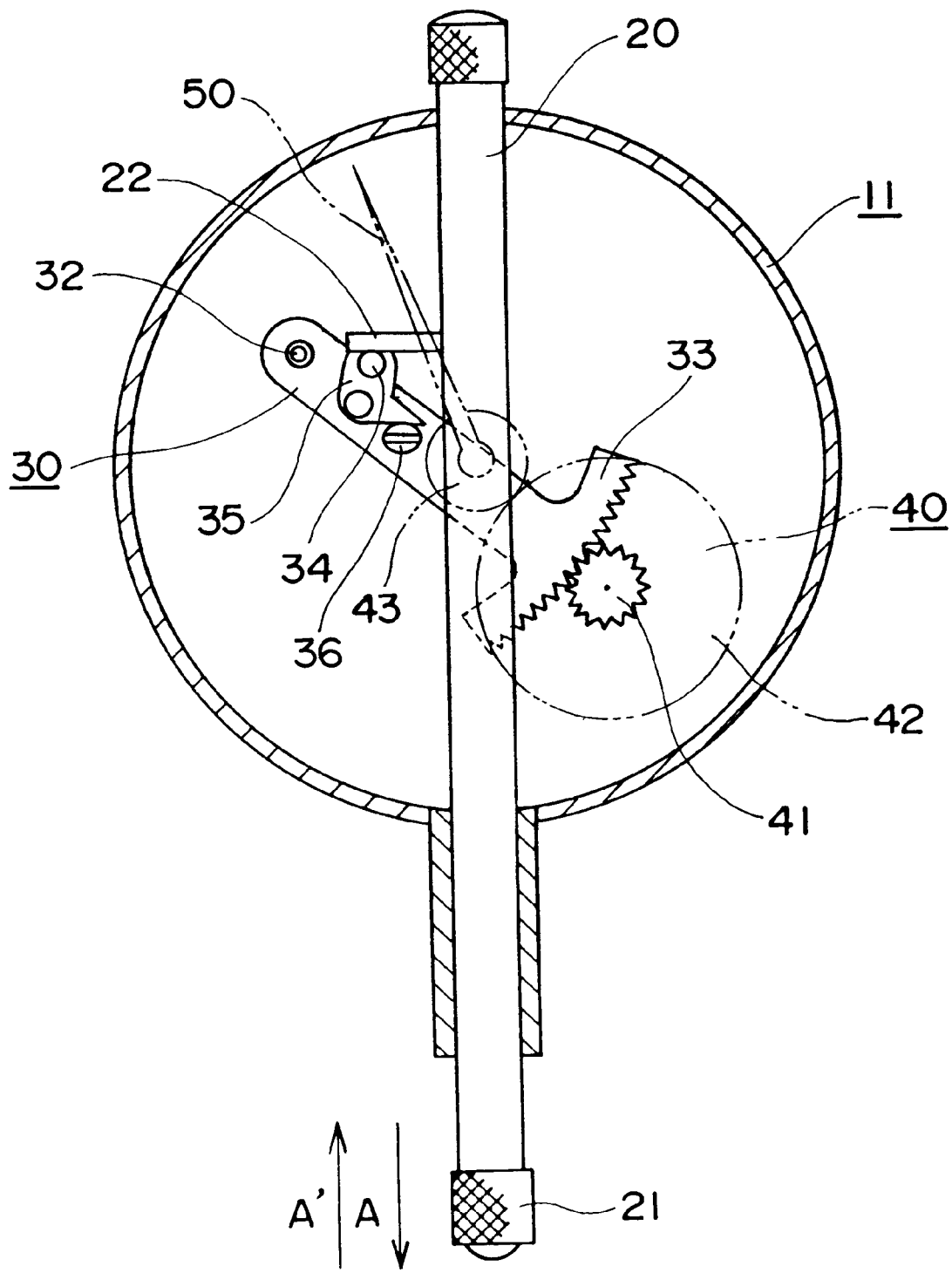
FIG. 7 is a cross sectional view of the inner structure of the conventional dial gauge.
Figure 8:
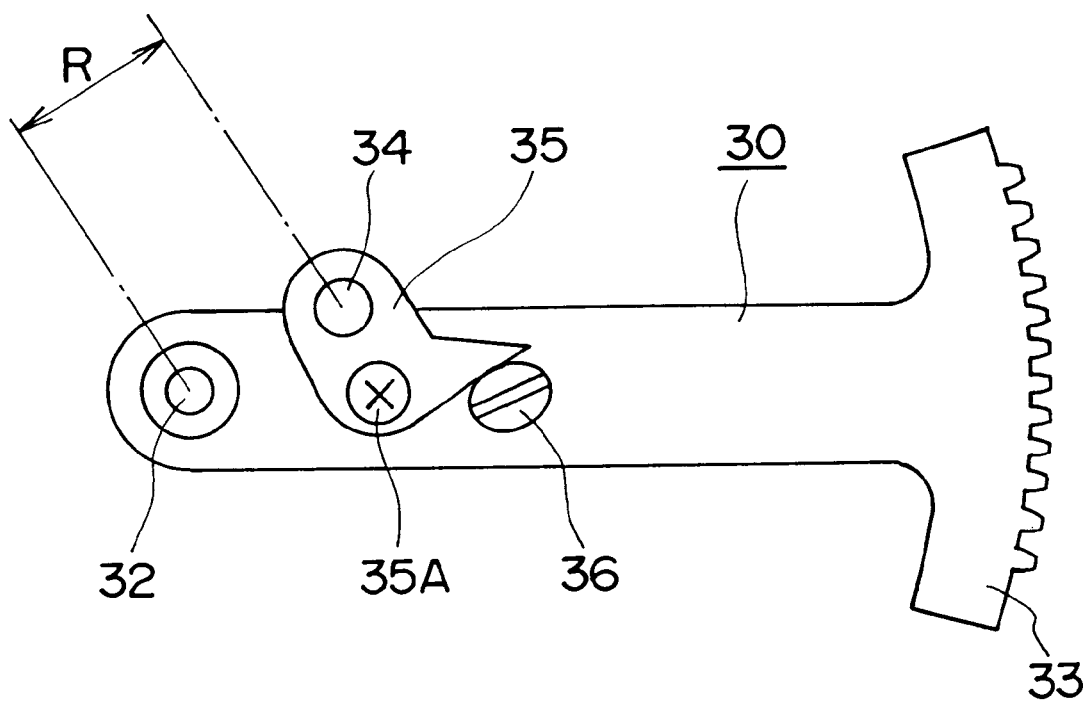
FIG. 8 is a front view of a sector gear of the conventional dial gauge.
Figure 9:
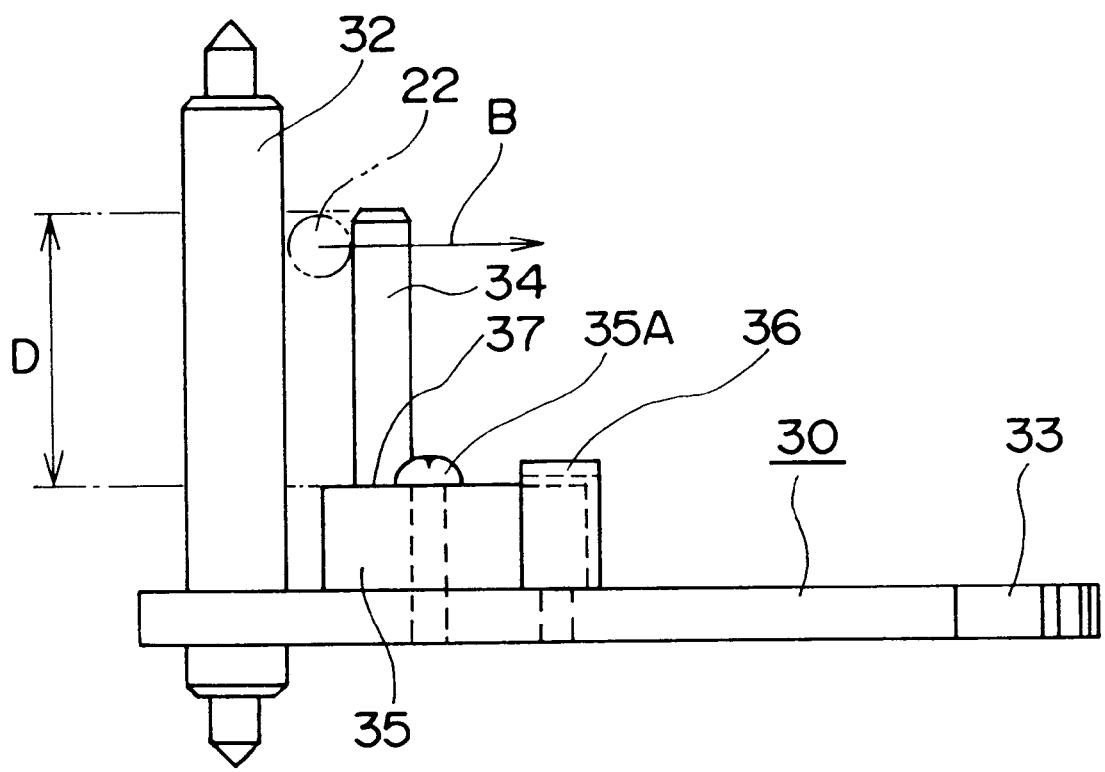
FIG. 9 is a side elevational view of the sector gear of the conventional dial gauge.

FIG. 1 shows a conversion mechanism of the dial gauge relating to the first embodiment, which corresponds to FIG. 7 of the conventional example.

There is a difference between FIG. 1 and FIG. 7 that the conventional sector gear 30 is provided with an arm 35 and an eccentric cam 36, and an arm pin 34 is provided on the arm 35 as an abutting portion, while the sector gear 130 of the first embodiment is integrally formed with plastic material and the sector pin 134 as the abutting portion is directly attached on the sector gear 130.

Figure 2:
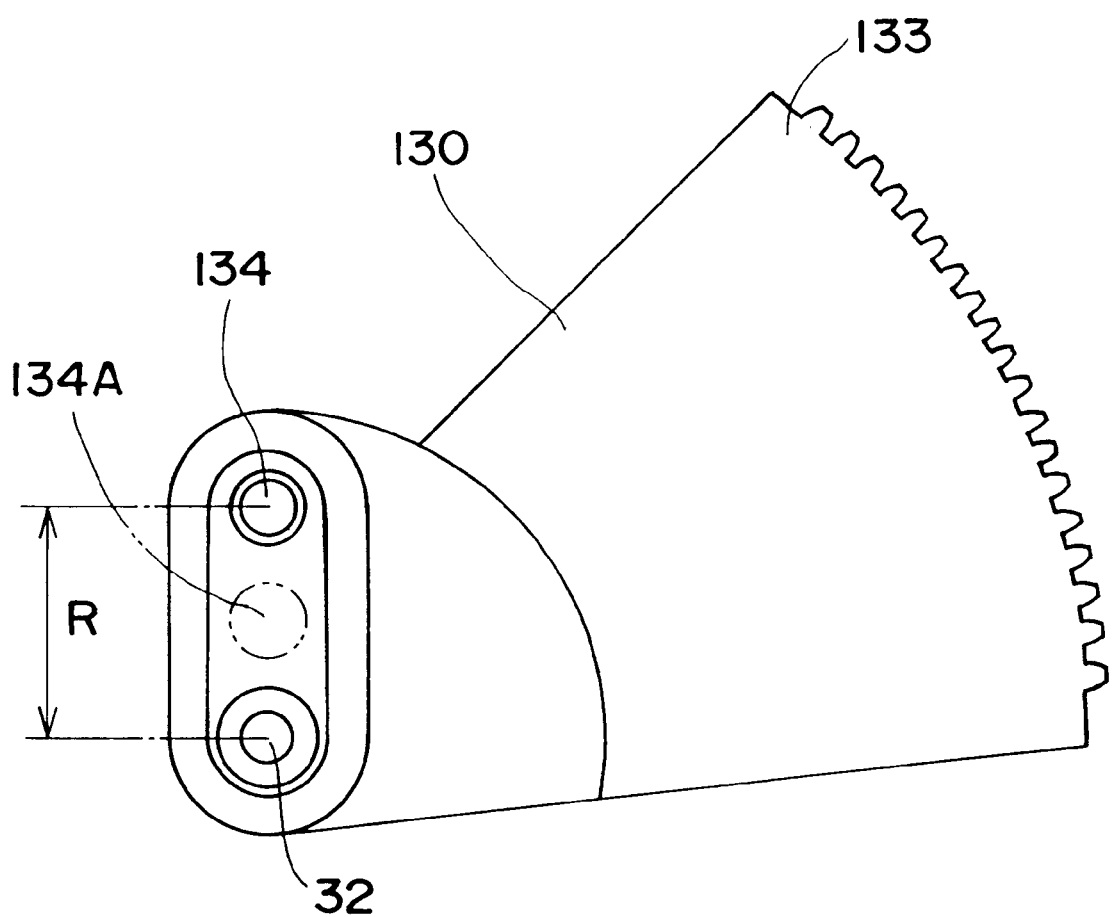
FIG. 2 is a front view of a sector gear in the above described embodiment.
Figure 3:
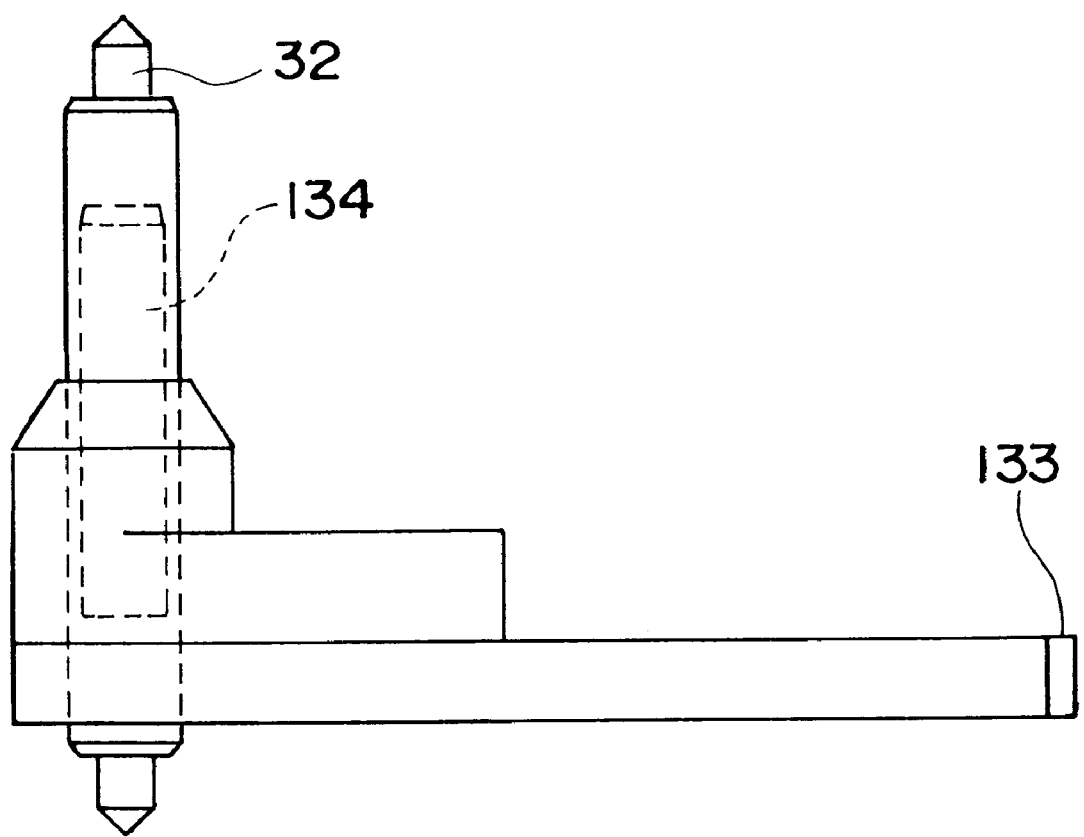
FIG. 3 is a side elevational view of the sector gear in the above described embodiment.

The sector gear 130 is an almost fan-shaped thin plate as shown in FIG. 2, and a gear portion 133 is formed on its arc portion. And as shown in FIG. 3, it is much thicker near the sector pin 134 and the sector shaft 32. The reason of having such thickness is to widen the contact area with the sector pin 134 and the sector shaft 32 so that they are securely unified.

The sector gear 130 is molded with a fiber reinforced plastic in which polyacetal (hereafter referred to as POM) is reinforced with potassium titianate whisker and the like.

The molding is carried out by insert molding, that is, the sector shaft 32 and the sector pin 134 which are made of metal rods, are set in advance in a mold, and the mold is filled with a plastic material.

It should be noted that the above described dimension R can be changed by changing the set position of the sector pin 134 on the mold. For instance, as shown in FIG. 2, when the set position of the sector pin 134 on the mold is changed to 134A where is nearer to the sector shaft 32, the dimension R can be changed.

The effects of the first embodiment will be described next.

As the sector gear 130, the sector shaft 32 and the sector pin 134 are integrally molded, the number of parts for molding the sector gear as well as parts cost can be decreased. Since the distance R between the sector shaft 32 and the sector pin 134 can be precisely maintained in a certain distance, the position adjustment of the sector pin 134 becomes unnecessary in assembling of the dial gauge, which results in simplifying the assembly of the dial gauge.

Since a fiber reinforced plastic is adopted as the material for the sector gear 130, the sector gear 130 formed can be improved not only in strength of the sector gear itself but also in abrasion resistance resulting from the adoption of POM.

Moreover adding of potassium titanate whisker to POM enables it to build up the sector gear having not only a high strength but also a good engaging property with other gears such as a middle pinion 41.

Furthermore as the sector pin 134 is planted in the sector gear 130 through insert molding, it becomes possible to change the dimension R between the sector shaft 32 and the sector pin 134 so that the sector gear 130 can be used even when the magnification of the pointer 50 is different.

Figure 4:
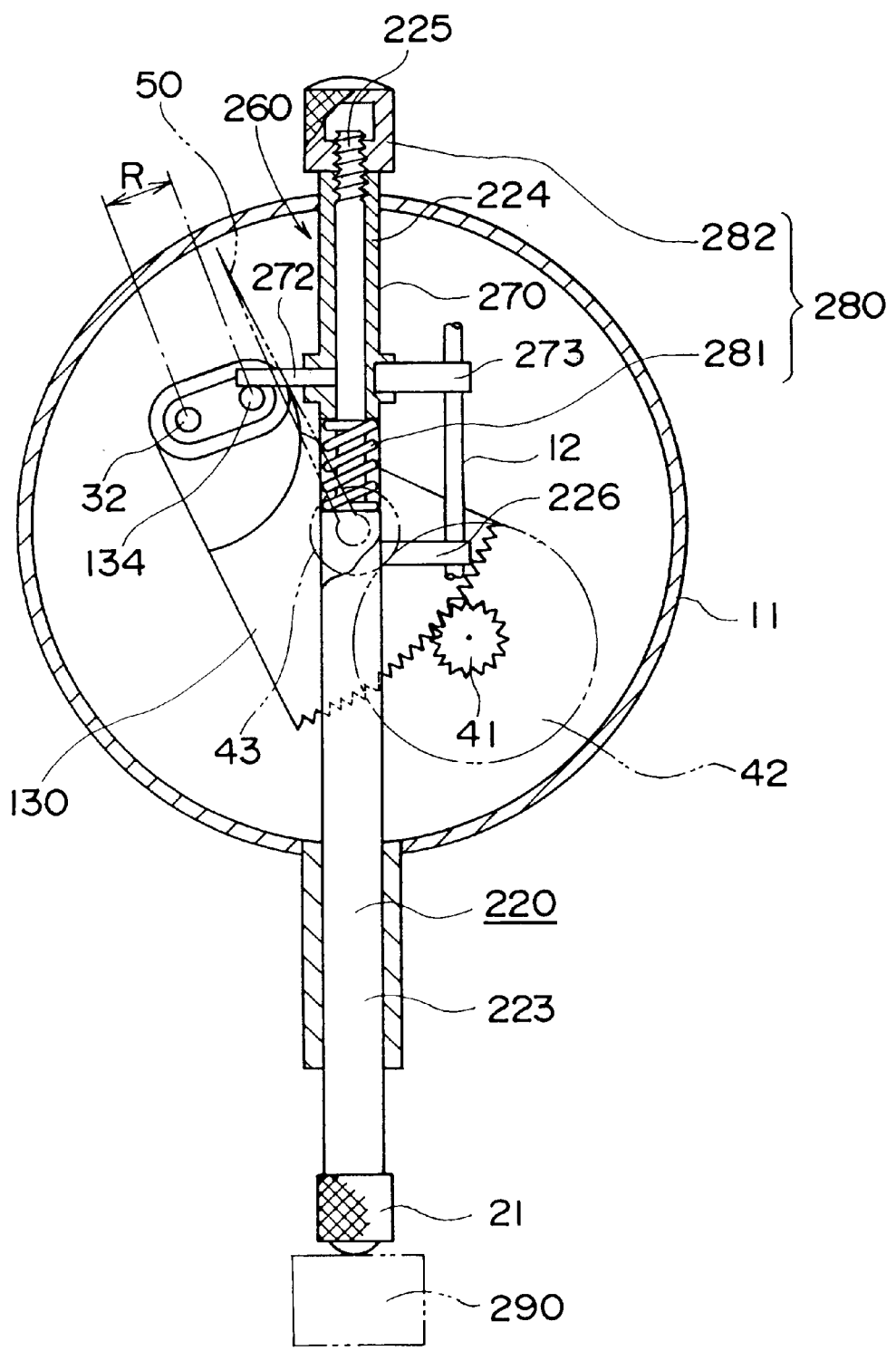
FIG. 4 is a cross sectional view of the inner structure of a dial gauge relating to a second embodiment of the present invention.

FIG. 4 shows the second embodiment of the present invention. The difference of the conversion mechanism of the dial gauge in the second embodiment from that in the first embodiment is that the pointer adjusting means by which the pointer 50 is adjustable from the outside of the body case 11 of the dial gauge, is provided on the spindle 220.

The spindle 220 is a rod-like member of which shaft diameter differs between a top end portion 223 on which the measuring point 21 is provided, and a base end portion 224 which is housed in the inside of the body case 11. A male thread portion 225 is formed on the base end.

On the middle of the spindle 220, a guide pin 226 perpendicularly protruding from the spindle shaft is provided. The guide pin 226 is put between 2 pieces of guides 12 provided on the case body, and is aimed at preventing the spindle 220 from turning around the axis and enabling it to move in the sliding direction.

The pointer adjusting means 260 is built with a sliding top 270 and a fixing means 280 to fix the sliding top 270 at any position on the shaft of the spindle 220.

The sliding top 270 is cylindrical and inserted by the base end portion 224 of the spindle 220 in the inside so that the sliding top is vertically slidable. Around the perimeter of the sliding top 270, a rack pin 272 which transmits to the sector pin 134 of the sector gear 130 and a guide pin 273 which controls a turning movement of the sliding top 270 in a similar way as the guide pin 226 to the spindle 220 protrude in a manner to cross at right angles to the axis of the spindle.

The fixing means 280 has a coil spring 281 which is provided below the sliding top 270 in FIG. 4, being inserted by the spindle 220 and an adjusting thread 282 which is provided above the sliding top 270, screwed on the male thread portion 225 of the spindle 220. The coil spring 281 serves as a resilient member and the adjusting thread 282 serves as an adjusting member.

The coil spring 281 is inserted by the spindle 220 in a compressed state, biasing the sliding top 270 toward the adjusting thread 282.

Adjusting the pointer by the pointer adjusting means 260 is carried out through the following steps.

An initial position of the pointer 50 is confirmed by abutting the measuring point 21 to the reference block 290. In this state when the turning angle of the pointer 50 is deviated toward the minus direction on the dial plate 51 (not shown in FIG. 4), tightening the adjusting thread 282 moves the sliding top 270 downward in FIG. 4, then the sector gear 130 turns clockwise. By the turning of the sector gear 130, the middle pinion 41, and a large gear wheel 42 turn counterclockwise, while the center pinion 43, and the pointer 50 turn clockwise, namely, toward the plus direction in the dial plate, which enable the pointer 50 to adjust to the zero position on the dial plate 51 (not shown in FIG. 4).

On the other hand, when the turning angle of the pointer 50 is deviated toward the plus direction, loosening the adjusting thread 282 moves the sliding top 270 which is resiliently biased upward in FIG. 4 by the compressed deformed coil spring 281, upward until abutting to the adjusting thread 282.

Then, the sector gear 130 which is forced to turn by the rack pin 272 is released and turns counterclockwise round the sector shaft. The middle pinion 41 and the large gear wheel 42 turn clockwise, while the center pinion 43 and the pointer 50 turn counterclockwise, enabling the pointer 50 to adjust to the zero position of the dial plate.

The conversion mechanism of the dial gauge relating to the second embodiment has following effects in addition to the above described effects of the first embodiment.

Namely, through providing the conversion mechanism with the pointer adjusting means 260, the pointer 50 can be adjusted by a simple procedure of setting the measuring point to the reference block 290 and turning the adjusting thread 282 so that the measurement can be carried out in an appropriate correspondence of the scale range on the dial plate 51 with the turning range of the pointer 50.

And the use of the adjusting thread 282 fitting to the male thread portion 225 of the spindle 220 as the adjusting member, enables a delicate pointer adjustment through a slight turn of the adjusting thread.

Further, as the dial plate 51 becomes unnecessary to turn due to providing the pointer adjusting means 260 to the conversion mechanism of the dial gauge, a turning mechanism of the dial plate 51 becomes also unnecessary to provide inside the body case 11.

Figure 5:
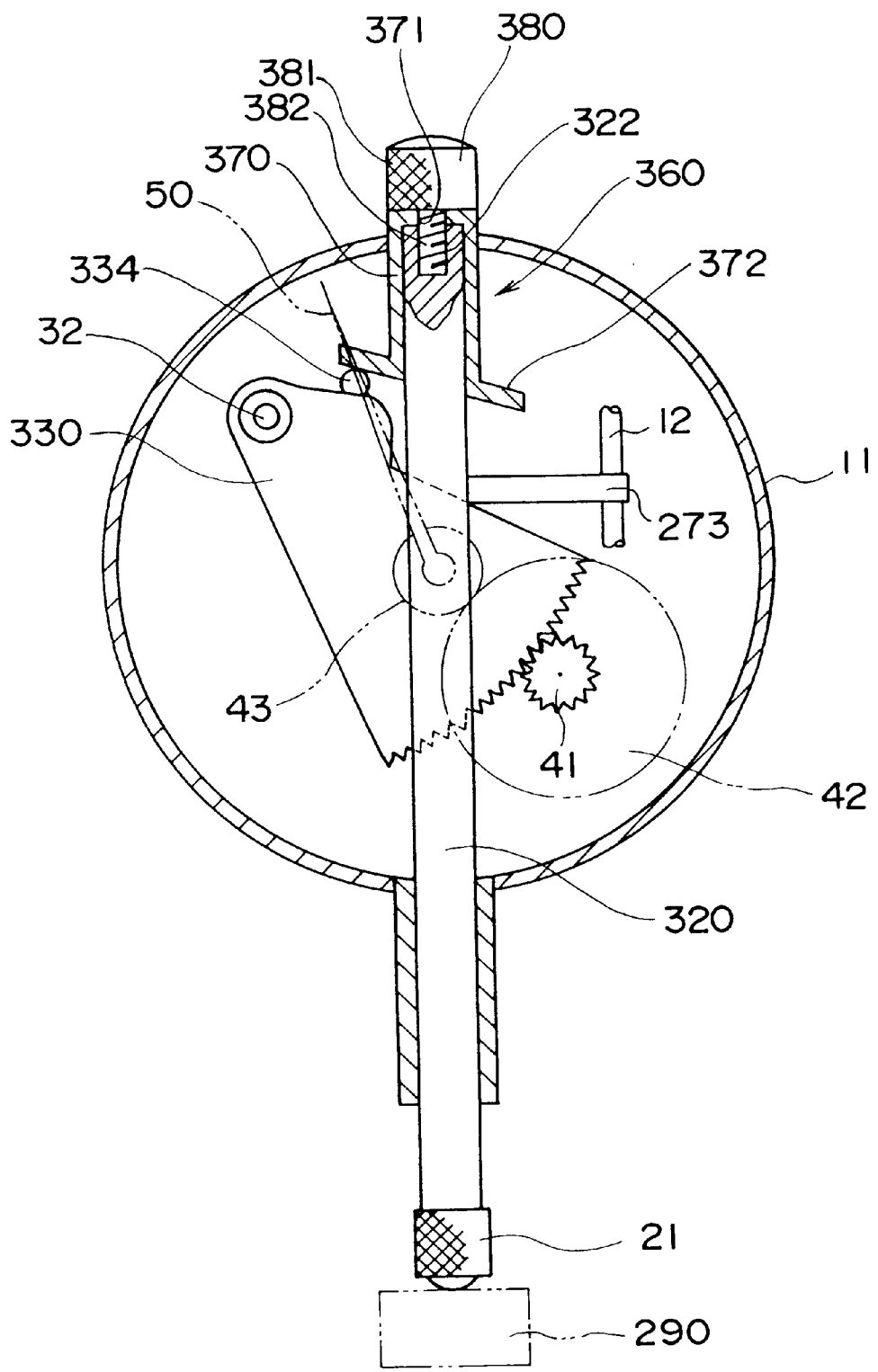
FIG. 5 is a cross sectional view of the inner structure of a dial gauge relating to a third embodiment of the present invention.
Figure 6:
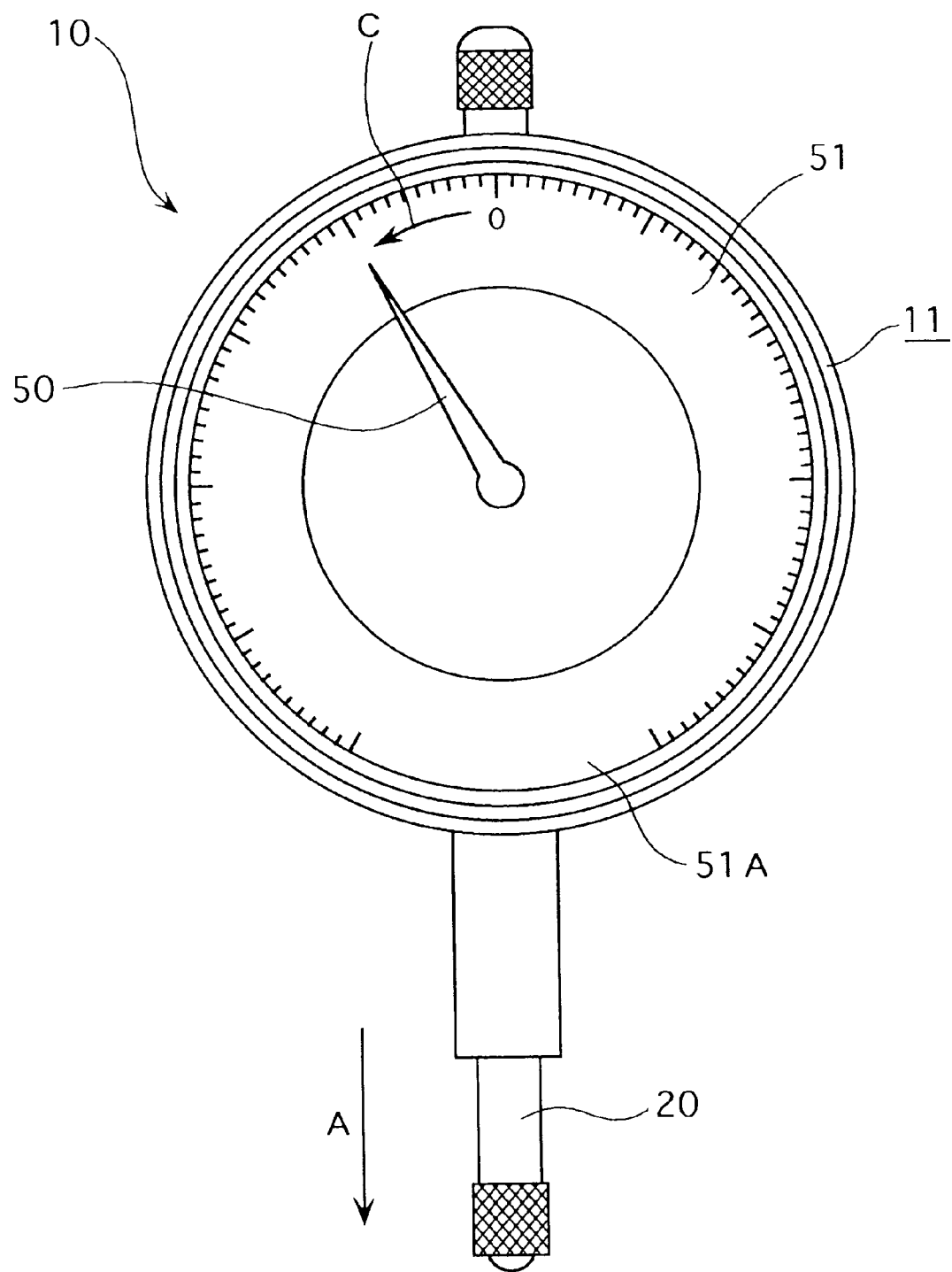
FIG. 6 is a front view of the outside appearance of a conventional dial gauge.

FIG. 5 shows a conversion mechanism of the dial gauge relating to the third embodiment of the present invention. In the second embodiment, the top (the sliding top 270) which is a component of the pointer adjusting means 260, is slidable in the axial direction of the spindle 220 and adjusts the pointer by vertical movement of the sliding top 270.

On the other hand, in the pointer adjusting means 360 relating to the third embodiment, the top (turning top 370) is turnable around the axis of the spindle 320, and the adjustment of the pointer is carried out by the turn of the turning top 370.

The spindle 320 is a rod-like member having the measuring point on the top end portion, forming a female thread portion 322 on the base end portion. A guide pin 273 is protruding on the middle portion, which controls the turning around the axis of the spindle 320 as in the case of the second embodiment.

The turning top 370 has a cylindrical shape, being closed on one end face corresponding to the upper portion in FIG. 5 and being opened on the other end face corresponding to the lower portion in FIG. 5. A hole 371 is formed on the closed end face. A brim-like protrusion 372 protruding toward the outside of the radial of the cylinder is formed on the other end face. The protrusion 372 is tilted to the cross section of the radial direction of the turning top 370 and serves as an engaging portion.

A fixing thread 380 which serves as a fixing means provides a head portion 381 which serves as a knob for turning and a male thread portion 382 which protrudes downward from the head portion 381 in FIG. 5, and the male thread 382 which is inserted into the hole 371 of the turning top 370 and screws to the female thread 322 of the spindle 320. It should be noted that, when the adjusting thread 380 is screwed in, the turning top 370 is pressed down by the bottom surface of the head portion 381, which restraints the turning of the turning top 370.

On the other hand, in the side of a sector gear 330, a metal sector ball 334 is buried and the sector ball 334 abuts to the above mentioned brim-like protrusion 372, converting the sliding movement of the spindle 320 into the tuning of the sector gear 330 around the sector shaft 32 through the turning top 370.

The sector gear 330 and the sector ball 334 are integrally built by insert molding as in the case of the sector pin 134 in the first embodiment.

The point adjustment by the point adjusting means 360 is carried out in much the same way as that in the second embodiment, but when the turning top 370 is turned in a loosen state of the fixing thread 380, the position of turning of the sector gear 330 is changed along the slope of the brim-like protrusion 372 through the sector ball 334 because the sector gear is forced to turn counterclockwise around the sector shaft 32.

In the third embodiment having such configurations, the following effects can be listed in addition to the effects in the second embodiment.

That is, since the structure is so simple as compared with the pointer adjusting means 260 of the above mentioned second embodiment that the pointer adjusting means can be provided to the dial gauge by adding a smaller number of parts.

And as is understood by comparing FIG. 4 with FIG. 5, the spindle 320 is simpler than the spindle 220 in the second embodiment and the manufacturing cost of the spindle can be reduced.

It should be mentioned that the present invention is not limited to the above described embodiment, it includes the following modification.

That is, in the above described embodiment, the sector gear 130 and 330 is a reinforced plastic molded part in which POM is reinforced with potassium titanate whisker, but a fiber reinforced plastic moldings in which POM is reinforced with glass fiber or carbon fiber can be included.

In the above described second embodiment, the sliding top 270 is a cylindrical member inserted by the spindle 220, but it is not limited to this, for instance, a sliding top which is cut out the side along the protruding direction can be also included.

Further, in the second embodiment, the rack pin 272 and the guide pin 273 are individually protruded on the sliding top 270, but not limited to this, for instance, a piece of pin can be protruded from the sliding top and the pin can be served both as a rack pin and a guide pin.

Further more, in the third embodiment, on the engaging portion of the turning top 370, a slope is formed around the whole circumference of the turning top but a partially sloped surface is acceptable, and a partial concave or convex slope surface which is cut out from a portion of a sphere, or a helical slope on the circumference of the turning top 370 is also within the scope of the present invention.

In the third embodiment, the engaging portion of the turing top 370 is the brim-like protrusion 372 provided on the bottom surface, but not limited to this, for instance, an end face of a thick cylindrical member can be the inclined plane.

And moreover, as specific structures, shapes and so on in carrying out the present invention, different structures capable to achieve the purposes of the present invention are included in the present invention.

What is claimed is:

1. A conversion mechanism of a dial gauge, comprising:
   a spindle provided in a slidable manner in a body case and having a measuring point on a top end portion in an axial direction;
   an engaging portion protruding toward the outside of a radial direction of said spindle, and moving with the slide movement of said spindle; and
   a sector gear pivotably attached to said body case and having an abutting portion abutting to said engaging portion,
   a slide movement of said spindle being converted into a turning movement of said sector gear through said engaging portion and said abutting portion, and the turning movement of said sector gear being converted into a turning amount of a pointer,
   said sector gear being a molded plastic material and said abutting portion being integrally formed with said sector gear by insert molding.

2. The conversion mechanism of the dial gauge according to claim 1, wherein said plastic material is a fiber reinforced plastic.

3. The conversion mechanism of the dial gauge according to claim 2, wherein said fiber reinforced plastic is polyacetal reinforced with potassium titanate whisker.

4. The conversion mechanism of the dial gauge according to claim 1, further comprising:

a pointer adjusting means for changing a turning angle of said pointer without changing the sliding direction of said measuring point.

5. The conversion mechanism of the dial gauge according to claim 2, further comprising:

a pointer adjusting means for changing a turning angle of said pointer without changing the sliding direction of said measuring point.

6. The conversion mechanism of the dial gauge according to claim 3, further comprising:

a pointer adjusting means for changing a turning angle of said pointer without changing the sliding direction of said measuring point.

7. The conversion mechanism of the dial gauge according to claim 4, wherein said pointer adjusting means is attached to said spindle in a slidable manner in the axial direction, and formed including a sliding top having said engaging portion and a fixing means for fixing said sliding top at any position in the axial direction of said spindle.

8. The conversion mechanism of the dial gauge according to claim 5, wherein said pointer adjusting means is attached to said spindle in a slidable manner in the axial direction, and formed including a sliding top having said engaging portion and a fixing means for fixing said sliding top at any position in the axial direction of said spindle.

9. The conversion mechanism of the dial gauge according to claim 6, wherein said pointer adjusting means is attached to said spindle in a slidable manner in the axial direction, and formed including a sliding top having said engaging portion and a fixing means for fixing said sliding top at any position in the axial direction of said spindle.

10. The conversion mechanism of the dial gauge according to claim 7, wherein said fixing means is formed including an adjusting member screwed in a base end portion of said spindle, and a resiliently biasing member forcing said sliding top in the direction to abut on said adjusting member.

11. The conversion mechanism of the dial gauge according to claim 8, wherein said fixing means is formed including an adjusting member screwed in the base end portion of said spindle, and a resiliently biasing member forcing said sliding top in the direction to abut on said adjusting member.

12. The conversion mechanism of the dial gauge according to claim 9, wherein said fixing means is formed including an adjusting member screwed in the base end portion of said spindle, and a resiliently biasing member forcing said sliding top in the direction to abut on said adjusting member.

13. The conversion mechanism of the dial gauge according to claim 4, wherein said pointer adjusting means is formed including a tuning top provided on said spindle in a turnable manner around the axial direction, having said engaging portion, and a fixing means for fixing said turning top at any angle;

wherein said engaging portion includes an inclined surface inclined against the cross section in the radial direction of said turning top.

14. The conversion mechanism of the dial gauge according to claim 5, wherein said pointer adjusting means is formed including a turning top provided on said spindle in a turnable manner around the axial direction, having said engaging portion, and a fixing means fixing said turning top at any angle;

wherein said engaging portion includes an inclined surface inclined against the cross section in the radial direction of said turning top.

15. The conversion mechanism of the dial gauge according to claim 6, wherein said pointer adjusting means is formed including a turning top provided on said spindle in a turnable manner around the axial direction, having said engaging portion, and a fixing means fixing said turning top at any angle;

wherein said engaging portion includes an inclined surface inclined against the cross section in the radial direction of said turning top.

* * * * *